(12) United States Patent (10) Patent No.: US 8,496,182 B2
Mizawa (45) Date of Patent: Jul. 30, 2013

(54) SHUTTER MECHANISM OF CARD READER AND CARD READER THEREBY

(75) Inventor: Mamoru Mizawa, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 230 days.

(21) Appl. No.: 12/865,283

(22) PCT Filed: Mar. 27, 2009

(86) PCT No.: PCT/JP2009/001400
§ 371 (c)(1),
(2), (4) Date: Sep. 15, 2010

(87) PCT Pub. No.: WO2009/122692
PCT Pub. Date: Oct. 8, 2009

(65) Prior Publication Data
US 2011/0006118 A1 Jan. 13, 2011

(30) Foreign Application Priority Data
Mar. 31, 2008 (JP) .................. 2008-090100

(51) Int. Cl.
*G06K 13/06* (2006.01)
*G06K 13/24* (2006.01)
*G06K 7/00* (2006.01)
*G06K 5/00* (2006.01)
*G06K 7/06* (2006.01)
*G06K 7/04* (2006.01)

(52) U.S. Cl.
USPC .......... 235/483; 235/486; 235/382; 235/435; 235/439; 235/441; 235/449

(58) Field of Classification Search
USPC ................. 235/483, 486, 380, 382, 435, 439, 235/441
See application file for complete search history.

(56) References Cited

U.S. PATENT DOCUMENTS

| | | | | |
|---|---|---|---|---|
| 6,446,872 | B1 * | 9/2002 | Imai et al. | 235/475 |
| 2002/0088862 | A1 * | 7/2002 | Imai et al. | 235/475 |
| 2002/0117550 | A1 * | 8/2002 | Hirasawa | 235/479 |
| 2004/0007620 | A1 * | 1/2004 | Hirasawa et al. | 235/449 |
| 2004/0035929 | A1 * | 2/2004 | Okada | 235/438 |

(Continued)

FOREIGN PATENT DOCUMENTS

| | | |
|---|---|---|
| JP | 03-174686 | 7/1991 |
| JP | 10-040344 | 2/1998 |

(Continued)

*Primary Examiner* — Daniel Walsh
(74) *Attorney, Agent, or Firm* — Frommer Lawrence & Haug LLP (57) ABSTRACT

A shutter mechanism of a card reader including a shutter part for opening/closing a card path through which a card is transferred. The shutter part includes: a closing part for closing the card path; a card contacting section, which contacts an end part of the card inserted into the card path, located at a further frontward position from the closing part in a direction X1; and shaft sections, having their rotation axis in a direction Y, for supporting the closing part and the card contacting section so as to keep them rotatable. The closing part and the shaft sections are located at their corresponding positions that are displaced from each other in a direction X. The closing part and the card contacting section rotate on the shaft sections to open the card path, when the end part of the card contacts with the card contacting section.

10 Claims, 8 Drawing Sheets

U.S. PATENT DOCUMENTS

| | | | |
|---|---|---|---|
| 2004/0094629 A1* | 5/2004 | Hirasawa et al. | 235/479 |
| 2006/0138241 A1* | 6/2006 | Kitazawa | 235/475 |
| 2007/0080225 A1* | 4/2007 | Hirasawa et al. | 235/449 |
| 2009/0020943 A1* | 1/2009 | Ohta | 271/109 |
| 2010/0176191 A1* | 7/2010 | Ramachandran et al. | 235/379 |
| 2010/0244375 A1* | 9/2010 | Hirabayashi et al. | 271/275 |
| 2011/0000965 A1* | 1/2011 | Hirabayashi et al. | 235/449 |
| 2011/0162941 A1* | 7/2011 | Mizawa et al. | 198/617 |

FOREIGN PATENT DOCUMENTS

| | | |
|---|---|---|
| JP | 2000-331125 | 11/2000 |
| JP | 2001-351069 | 12/2001 |
| JP | 2004-310496 | 11/2004 |

\* cited by examiner

SHUTTER MECHANISM OF CARD READER AND CARD READER THEREBY

The present application claims priority from PCT Patent Application No. PCT/JP2009/001400 filed on Mar. 27, 2009, which claims priority from Japanese Patent Application No. JP 2008-090100 filed on Mar. 31, 2008, the disclosure of which is incorporated herein by reference in its entirety.

BACKGROUND OF THE INVENTION

1. Field of the Invention

The present invention relates to a shutter mechanism of a card reader for opening/closing a card path, through which a card is transferred, and a card reader equipped with the shutter mechanism.

2. Description of Related Art

Conventionally, a card insertion slot of a card reader for reproducing information recorded in a card and/or recording information into a card is equipped with a shutter mechanism for opening/closing a card path (For example, refer to Japanese Unexamined Patent Application Publication No. 2000-331125 (hereinafter "Patent Document 1") and Japanese Unexamined Patent Application Publication No. H10-40344 (hereinafter "Patent Document 2")).

A shutter mechanism disclosed in Patent Document 1 includes a shutter plate for closing a card path, a solenoid as a driving source, a slide lever that slides by motivity of the solenoid, and a swing arm that rotates accordingly as the slide lever slides. In the shutter mechanism, the shutter plate is so placed at a lower end of the swing arm as to hang on there, and then the shutter plate moves vertically to open/close the card path accordingly as the swing arm rotates. Placed at a backside of the shutter plate in this shutter mechanism is a base plate to which the solenoid is fixed.

A shutter mechanism disclosed in Patent Document 2 includes a shielding member for closing a card path, and a solenoid as well as a plunger for locking the shielding member. In the shutter mechanism, the shielding member is supported by a shaft, which is placed at an upper position of the card path so as to intersect the card path, in such a way as to be freely swing-able. When a pinching section prepared at a forefront side of the plunger pinches a lower end of the shielding member, the card path is closed.

SUMMARY OF THE INVENTION

Unfortunately, it is indispensable for the shutter mechanisms described in Patent Document 1 and Patent Document 2 to have a solenoid for opening/closing the card path so that those shutter mechanisms become larger as well as costly.

Furthermore, in the case of the shutter mechanism described in Patent Document 1, the shutter plate is so placed at a lower end of the swing arm as to hang on there, and accordingly a connection point connecting the swing arm and the shutter plate works as a fulcrum of power when any foreign material gets inserted forcibly into the card path to come in contact with the shutter plate. Then, while the contact point with the foreign material working as an operating point of power at the time when the foreign material comes in contact with the shutter plate, and the connection point of the swing arm and the shutter plate working as a fulcrum of power at the same time; a distance in a vertical direction between the contact point and the connection point becomes long. Therefore, a large bending force is likely to act on the connection point of the swing arm and the shutter plate. Accordingly, without the base plate at the backside of the shutter plate, insertion of a foreign material may result in deforming the connection point of the swing arm and the shutter plate so that it may become impossible to prevent insertion of foreign materials.

Thus, it is an object of the present invention to provide a shutter mechanism of a card reader and a card reader equipped with the shutter mechanism that enable improvement of the strength required for preventing insertion of foreign materials into the card reader, more than expected conventionally, with a simple mechanical structure.

To solve the problem described above, a shutter mechanism of a card reader according to the present invention includes: a shutter part for opening/closing a card path through which a card is transferred; wherein the shutter part has; a closing part for closing the card path, a card contacting section located at a further frontward position from the closing part in an inserting direction of the card; an end part of the card inserted into the card path coming into contact with the card contacting section, and shaft sections, having their rotation axis in a direction almost perpendicular to the card inserting direction, for supporting the closing part and the card contacting section so as to keep them rotatable; and the closing part and the shaft sections are located at their corresponding positions that are displaced from each other in the card transfer direction; and the closing part and the card contacting section rotate on the shaft sections to open the card path, when the end part of the card contacts with the card contacting section.

In the shutter mechanism according to the present invention, when the end part of the card contacts with the card contacting section, the closing part for closing the card path together with the card contacting section rotate on the shaft sections to open the card path. Therefore, no driving source for opening/closing the card path is needed and the shutter mechanism can be simplified.

In the present invention, the shaft sections act as a rotation center of the closing part. Therefore, in the case where a foreign material is inserted into the card path to collide with the closing part, a force of the collision acts on the shaft sections. However, in the present invention, the closing part and the shaft sections are located at their corresponding positions that are displaced from each other in the inserting direction of the card. Accordingly, this arrangement enables shortening a distance from a spot on the closing part, where the foreign material collides with, to the shaft sections in a thickness direction of the card. Then, it is likely that either a compressive force in a direction toward the shaft sections or a tensile force in a direction away from the shaft sections simply acts on the shutter part, when the foreign material collides with the closing part. As a result, in the present invention, the shutter mechanism can have an improved strength required for preventing insertion of a foreign material in comparison with a shutter mechanism of a conventional structure.

In the present invention, it is preferable that a center of the card path in a thickness direction of the card almost coincides with a radial center of the shaft sections in the card thickness direction. According to this structure, either a compressive force in a direction toward the shaft sections or a tensile force in a direction away from the shaft sections acts on the shutter part, when the foreign material collides with the closing part for closing the card path. Therefore, the strength of the shutter part required for preventing insertion of a foreign material can be enhanced effectively.

In the present invention, it is preferable that the shaft sections are located at a further backward position from the shutter part in the card inserting direction. According to this structure, the shutter part can rotate easily when the card is transferred in an ejecting direction. Then, the card at the time of being ejected easily passes through a section of the shutter mechanism so that the card can be ejected smoothly.

In the present invention, it is preferable that the card contacting section includes rollers that rotate while contacting with the card. According to this structure, the card can be transferred smoothly, and a transfer load for the card can be reduced. Furthermore, causing damage on the card can be suppressed.

In the present invention, it is preferable that the card contacting section includes slants, for contacting with the end part of the card, at a further frontward position from the rollers in the card inserting direction; and the rollers revolve around the shaft sections in a direction to open the card path when the end part of the card comes in contact with the slants. According to this structure, even if a diameter of the rollers is prepared to be small, the rollers rotate smoothly at the time when the end part of the card comes in contact with the rollers. As a result, the shutter mechanism can be downsized by making the diameter of the rollers smaller.

In the present invention, it is preferable that the shutter part includes card transit sections, at a further backward position from the closing part in the card inserting direction, the for guiding the card in a backward direction of the card path in the card insertion direction when the closing part and the card contacting section rotate in the direction to open the card path. According to this structure, in the case where a main body of the card reader is located at a backward side of the shutter mechanism, for example, the card can be guided appropriately to the main body of the card reader even without preparing a guide mechanism separately for guiding the card to the main body.

In the present invention, it is preferable that the closing part includes a tilted surface tilting so as to make the closing part rotate in a reverse direction to the direction of opening the card path when being pressed from a inserting side of the card under the condition where the card path is closed. According to this structure, the arrangement described above enables surely preventing insertion of the foreign material into the card path.

The shutter mechanism of a card reader according to the present invention can be employed at a card insertion slot of the card reader. The card reader enables improvement of the strength of the shutter mechanism required for preventing insertion of foreign materials, more than expected conventionally, with an easy mechanical structure.

In the present invention, it is preferable that the card insertion slot includes: a light emitting member that flashes when the card exists in the main body of the card reader, and a cover being transparent or translucent for covering the light emitting member. According to this structure, it can be visually checked whether the card exists in the main body or not, and therefore it can be avoided to wrongly insert the card into the card reader.

As described above, the shutter mechanism of a card reader according to the present invention enables improvement of the strength required for preventing insertion of foreign materials, more than expected conventionally, with an easy mechanical structure. Furthermore, the card reader according to the present invention enables improvement of the strength of the shutter mechanism required for preventing insertion of foreign materials, more than expected conventionally, with an easy mechanical structure.

BRIEF DESCRIPTION OF THE DRAWINGS

FIG. 5 includes drawings to show a shutter section main body shown in FIG. 3; namely.

FIG. 6 includes drawings for explanation of operations of the shutter mechanism shown in FIG. 3 at the time of inserting a card; namely.

FIG. 7 includes drawings for explanation of operations of the shutter mechanism shown in FIG. 3 at the time of ejecting a card; namely, FIG. 8 includes plan views for explanation of a structure of a shutter mechanism according to another embodiment of the present invention; namely.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
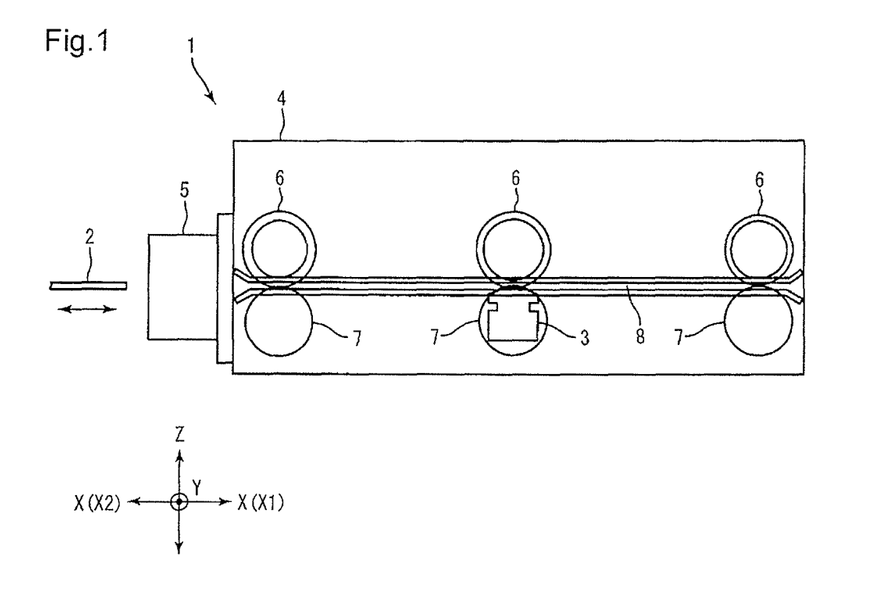
FIG. 1 is a drawing for explanation of a schematic structure of a card reader in a side view according to an embodiment of the present invention.

Schematic Structure of Card Reader:

FIG. 1 is a drawing for explanation of a schematic structure of a card reader 1 in a side view according to an embodiment of the present invention.

The card reader 1 according to the embodiment reproduces information recorded in a card 2 and/or records information into the card 2. As shown in FIG. 1, the card reader 1 includes a main body 4 equipped with a magnetic head 3 for reproducing and/or recording magnetic information, and a card insertion slot 5 for inserting the card 2.

The main body 4 includes a plurality of transfer rollers 6 for transferring the card 2 inside the main body 4, a plurality of pad rollers 7 that are faced toward and biased against the transfer rollers 6, and a roller drive mechanism (not shown) for driving the transfer rollers 6, in addition to the magnetic head 3. Furthermore, a path 8 for transferring the card 2 is formed in the main body 4.

Formed on a surface of the card 2 is a magnetic stripe (not shown) in which magnetic information is recorded. Incidentally, an IC chip may as well be fixed onto the surface of the card 2. Furthermore, a communication antenna may be built in the card 2, and formed on the surface of the card 2 may be a print area as well in which character printing is carried out with a thermal printing method. In other words, the card reader 1 is not limited to a magnetic card reader, but may be either of a contact-type IC card reader and a non-contact IC card reader, as well as a card reader equipped with a thermal printing mechanism.

Figure 2:
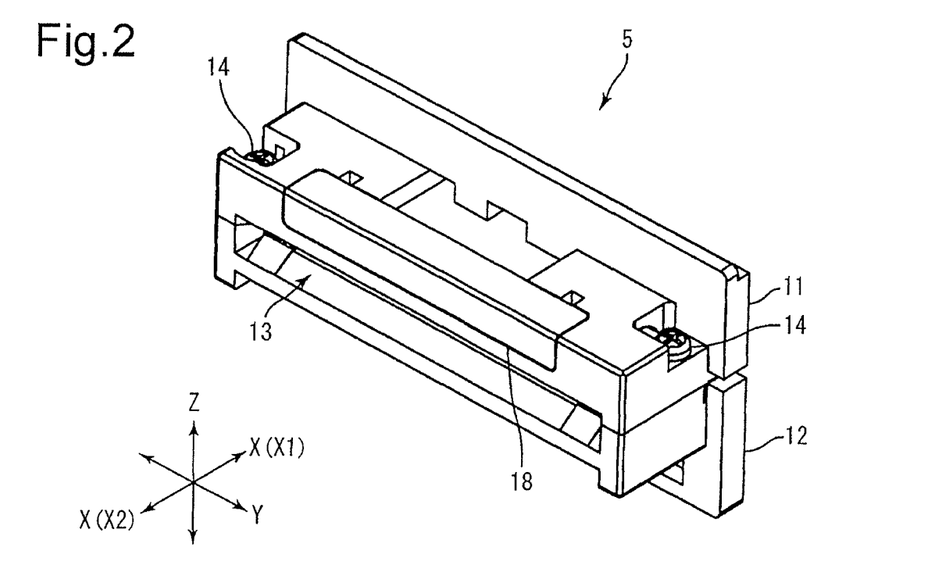
FIG. 2 is a perspective view of a card insertion slot shown in FIG. 1.
Figure 3:
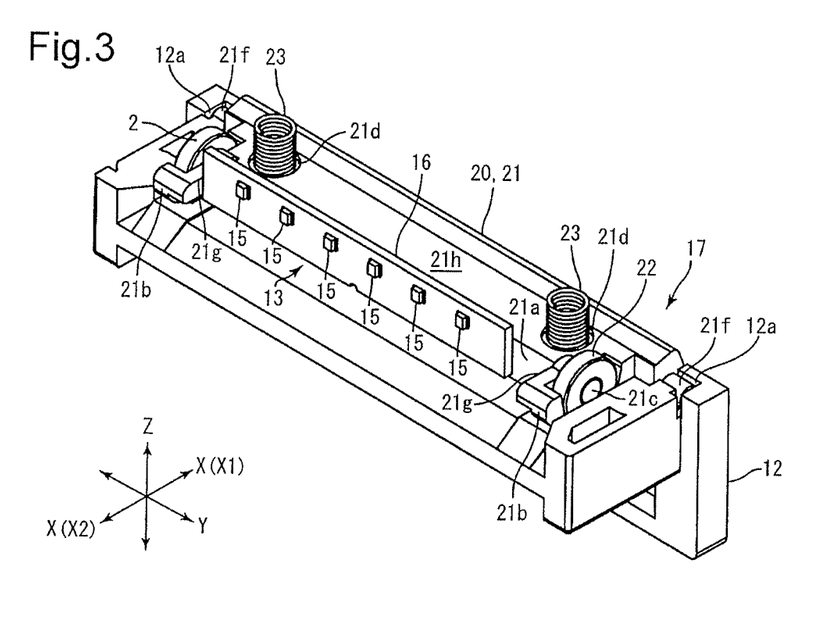
FIG. 3 is a perspective view of the card insertion slot shown in FIG. 2, under conditions where an upper bezel and some other components are dismantled.
Figure 4:
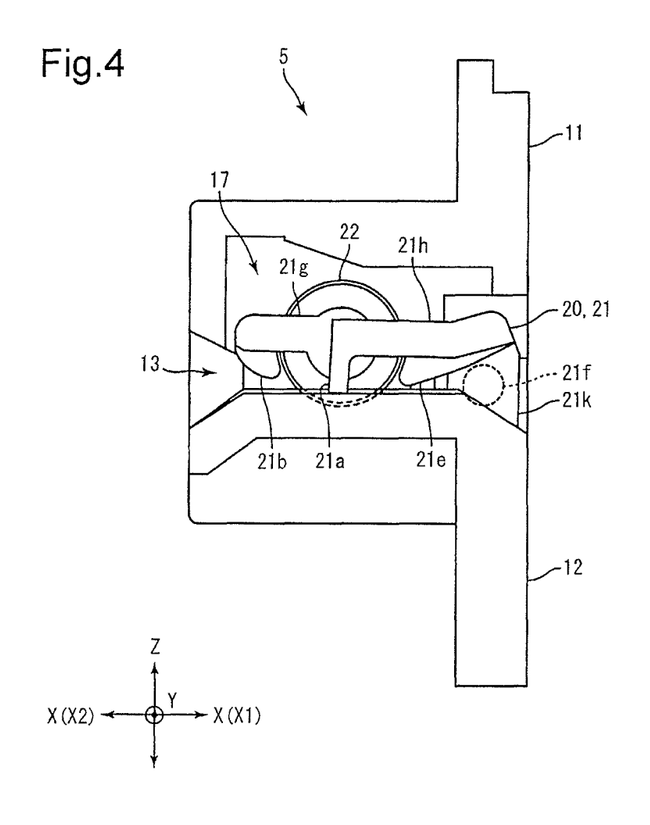
FIG. 4 is a drawing for explanation of an internal structure of the card insertion slot shown in FIG. 2.
Figure 5A:
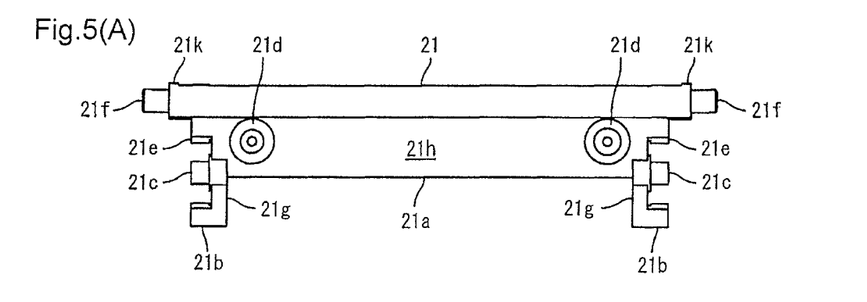
FIG. 5A is a plan view.
Figure 5B:
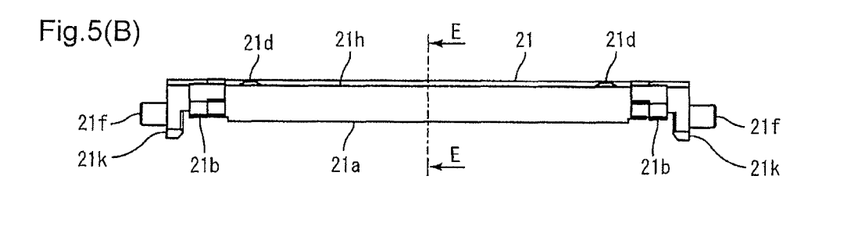
FIG. 5B is an elevation view.
Figure 5C:
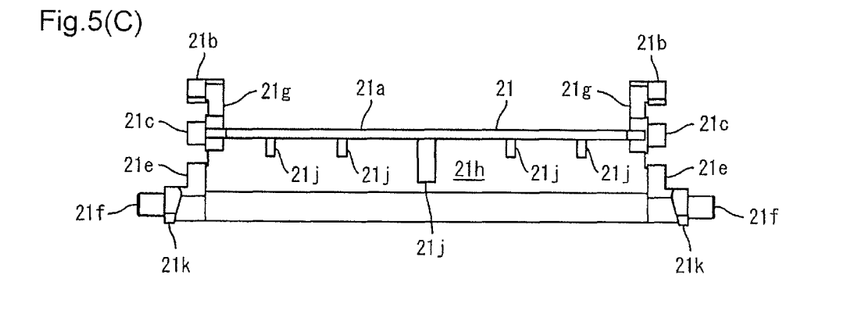
FIG. 5C is a bottom plan view.
Figure 5D:
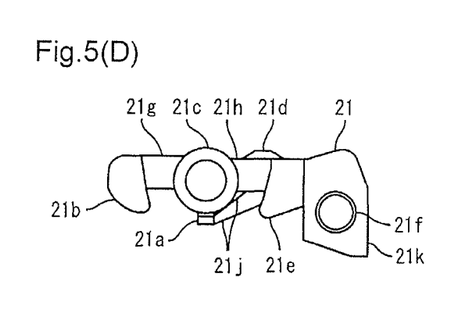
FIG. 5D is a side view.
Figure 5E:
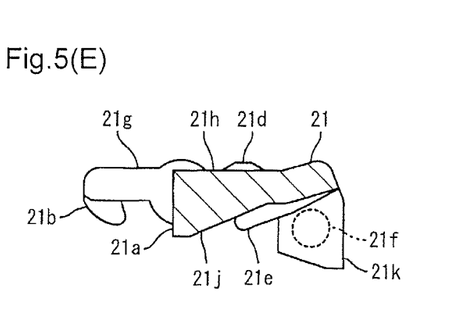
FIG. 5E is a cross-section view taken from the line E-E in FIG. 5B.

Structure of Card Insertion Slot:

FIG. 2 is a perspective view of the card insertion slot 5 shown in FIG. 1. FIG. 3 is a perspective view of the card insertion slot 5 shown in FIG. 2, under conditions where an upper bezel 11 and some other components are dismantled. FIG. 4 is a drawing for explanation of an internal structure of the card insertion slot 5 shown in FIG. 2. FIG. 5 includes drawings to show a shutter part main body 21 shown in FIG. 3; namely, FIG. 5A is a plan view, FIG. 5B is an elevation view, FIG. 5C is a bottom plan view, FIG. 5D is a side view, and FIG. 5E is a cross-section view taken from the line E-E in FIG. 5B.

The card insertion slot 5 includes an upper bezel 11 constituting an upper body of the card insertion slot 5, and a lower bezel 12 constituting a lower body of the card insertion slot 5. The upper bezel 11 and the lower bezel 12 are fixed with each other by using screws 14; and a card path 13 for transferring the card 2 is formed between the upper bezel 11 and the lower bezel 12, as shown in FIG. 4. Furthermore, the card insertion slot 5 internally includes a board 16, to which a plurality of light emitting elements 15 as light emitting members are fixed, and a shutter mechanism 17 for closing the card path 13, as shown in FIGS. 3 and 4.

In the present embodiment, the card 2 is transferred in a direction X shown in FIG. 2. Specifically, the card 2 is inserted and ejected in a direction X1 and a direction X2 shown in FIG. 2, respectively. In other words, the direction X is a transfer direction of the card 2, the direction X1 is an inserting direction of the card 2, and the direction X2 is an ejecting direction of the card 2 in the present embodiment 4. Furthermore, in FIG. 2, a direction Z is a thickness direction of the card 2; and meanwhile a direction Y, being perpendicular to both the direction X and the direction Z, is a widthwise direction. In the following explanation, the direction X1 and the direction X2 are called a backward direction and a frontward direction, respectively; and the direction Z is a vertical direction of the card insertion slot 5 in the present embodiment.

The light emitting elements 15 are, for example, LEDs (Light Emitting Diodes). The board 16, to which the light emitting elements 15 are fixed, is located above the card path 13. Moreover, the board 16 is fixed to the upper bezel 11 in such a way that a mounting surface for the light emitting elements 15 is oriented in the frontward direction. Fixed to the upper bezel 11 is a cover 18, being transparent or translucent, for covering the board 16. Namely, a fixing part for fixing the cover 18 is prepared at a boundary area of an upper end of the upper bezel 11 and a forefront end of the upper bezel 11 corresponding to a fixing position for the board 16.

In the present embodiment; when a sensor (not shown) placed in the main body 4 detects the card 2 (namely, when the card 2 is positioned in the main body 4), the light emitting elements 15 flash. Meanwhile, the cover 18 is transparent or translucent. Therefore, by visually checking whether or not the emitting elements 15 are flashing, a user can recognize whether the card 2 exists in the main body 4 or not.

The shutter mechanism 17 includes a shutter part 20 for opening/closing the card path 13, and compression coil springs 23 for biasing the shutter part 20 downward. Then, the shutter part 20 includes a shutter part main body 21 that can rotate on its rotation axis in the direction Y, and rollers 22 that are so supported by the shutter part main body 21 as to be able to rotate.

As shown in FIG. 5, the shutter part main body 21 includes a closing part 21a for closing the card path 13, slants 21b for coming into contact with a backward end of the card 2 inserted (i.e., a forefront of the card), roller holders 21c for holding the rollers 22, spring contact sections 21d that bottom ends of the compression coil springs 23 contact with, card transit sections 21e for guiding the inserted card 2 toward the main body 4, and shaft sections 21f for supporting the entire part of the shutter part main body 21 to be able to rotate on its rotation axis in the direction Y.

The shutter part main body 21 in the present embodiment is made of resin. Furthermore, the closing part 21a, the slants 21b, the roller holders 21c, the spring contact sections 21d, the card transit sections 21e, and the shaft sections 21f are jointly formed in the shutter part main body 21.

The closing part 21a is so formed as to be a slender rectangular flat plate having its longitudinal direction in the direction Y. Furthermore, the closing part 21a is formed almost at a middle position of the shutter part main body 21 in the direction X.

The slants 21b are formed, being block-shaped, at frontward ends of protrusions 21g protruding in the frontward direction from both ends in the direction Y of the closing part 21a. The bottom sides of the slants 21b are curvedly formed in such a way that the slant surface is further curved in a lower direction as it is positioned further in the backward direction. Concretely to describe, the bottom sides of the slants 21b are formed to be almost round-shaped in such a way that the slant surface is further curved in a lower direction as it is positioned further in the backward direction. Moreover, the bottom backward ends of the slants 21b are round-manufactured so that the bottom backward ends of the slants 21b are formed to be round-shaped having a small curvature.

A distance between inner-side ends of the two slants 21b in the direction Y is narrower than a width dimension of the card 2 in its widthwise direction. Meanwhile, a distance between outer-side ends of the two slants 21b in the direction Y is almost the same as, or somewhat wider than the width dimension of the card 2 in its widthwise direction.

The roller holders 21c are so formed as to be cylindrical and to protrude from both the ends in the direction Y of the closing part 21a in an outward direction of the direction Y. Furthermore, the roller holders 21c are placed at further backward positions from the slants 21b. The rollers 22 are inserted into the roller holders 21c, and are supported by the roller holders 21c so as to be able to rotate.

The spring contact sections 21d are formed on a top surface of a plane 21h prepared from an upper end of the closing part 21a toward the backward direction. In the present embodiment, two of the spring contact sections 21d are formed there with a prescribed distance between them in the direction Y. Furthermore, formed under a bottom surface of the plane 21h are a plurality of braces 21j, as shown in FIG. 5C Being formed from a frontward end of the plane 21h toward the backward direction, each of the braces 21j is shaped to be a flat triangle whose oblique line is tilted upward as a point of the oblique line is positioned further in the backward direction. Then, one of the braces 21j located at a center position in the direction Y is formed to be larger than the others of the braces 21j.

The card transit sections 21e are formed, being block-shaped, at positions of backward ends of the plane 21h that are also both ends in the direction Y of the plane 21h. In other words, the card transit sections 21e are placed at further backward positions from the closing part 21a. The locations of the transit sections 21e are also at further backward positions from the roller holders 21c. Bottom sides of the card transit sections 21e are formed to be flat in such a way that the bottom sides are tilted upward as a point of the bottom sides is positioned further in the backward direction, when the card path 13 is closed (namely, when a bottom end of the closing part 21a comes in contact with a bottom surface of the card path 13), as described later. Moreover, the bottom frontward ends of the card transit sections 21e are round-manufactured so that the bottom frontward ends of the card transit sections 21e are formed to be round-shaped having a small curvature.

Being made cylindrical, the shaft sections 21f are so formed as to protrude from both ends in the direction Y of the shaft base parts 21k in an outward direction of the direction Y; the shaft base parts 21k being formed at further backward positions from the closing part 21a. Concretely to describe, the shaft sections 21f are formed at lower positions from both ends in the direction Y of the backward end of the shutter part main body 21. Then, the shaft sections 21f are so formed as to protrude further in the outward direction of the direction Y than the slants 21b, the roller holders 21c, and the card transit sections 21e.

The shaft sections 21f are engaged with shutter part support sections 12a formed in the lower bezel 12 and so supported by the shutter part support sections 12a as to be able to rotate, as shown in FIG. 3.

According to the present embodiment, the position of the card path 13 almost coincides with that of the shaft sections 21f in the direction Z, as shown in FIG. 4. Specifically, the shaft sections 21f are formed in such a way that a center of the card path 13 in the direction Z almost coincides with a radial center of the shaft sections 21f in the direction Z.

The bottom ends of the compression coil springs 23 contact with the spring contact sections 21d, while top ends of the compression coil springs 23 contact with the upper bezel 11. The compression coil springs 23 are located at further frontward positions from the shaft sections 21f. Accordingly, due to a biasing force of the compression coil springs 23, the shutter part main body 21 is biased to rotate on the center of the shaft sections 21f in a counterclockwise direction in FIG. 4. Then, as shown in FIG. 4, the bottom end of the closing part 21a usually comes in contact with the bottom surface of the card path 13.

When coming in contact with the bottom surface of the card path 13, the closing part 21a closes the card path 13. In other words, the closing part 21a coming in contact with the bottom surface of the card path 13 materializes a condition of the card path 13 closed. Under the condition, a frontward wall of the closing part 21a (a left surface in FIG. 4) is so tilted somewhat as to have a lower part on the wall positioned further frontward. Under the condition, the slants 21b are somewhat lifted up away from the bottom surface of the card path 13. Furthermore, under the condition, the bottom ends of the rollers 22 are placed into dents (not shown) formed on an upper surface of the lower bezel 12 so that the bottom ends of the rollers 22 are positioned to be lower than the bottom surface of the card path 13. Under the condition, both the ends in the direction Y of the card path 13 are closed with the slants 21b.

Figure 6A:
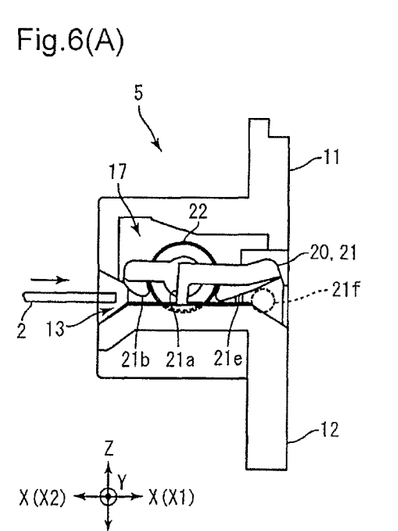
FIG. 6A shows a condition at the time of starting insertion of the card.
Figure 6B:
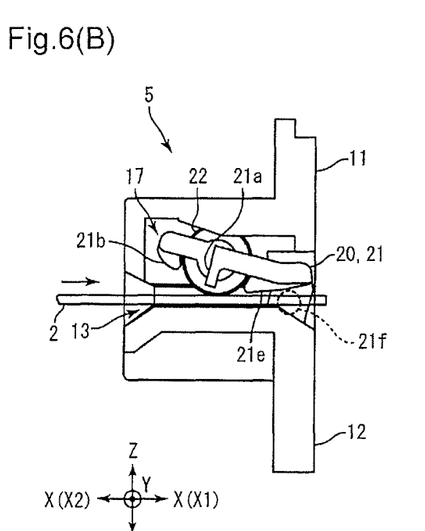
FIG. 6B shows a condition when the card being inserted.
Figure 7A:
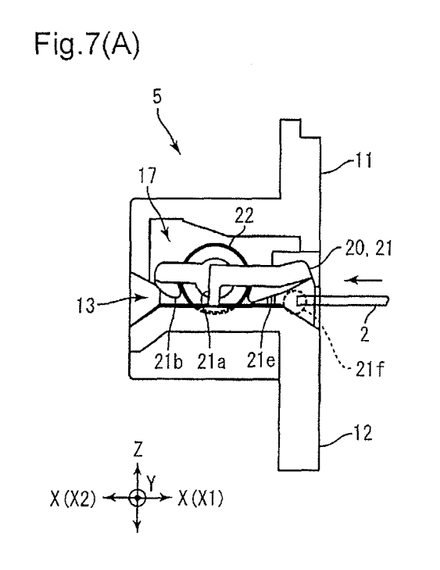
FIG. 7A shows a condition at the time of starting ejection of the card.
Figure 7B:
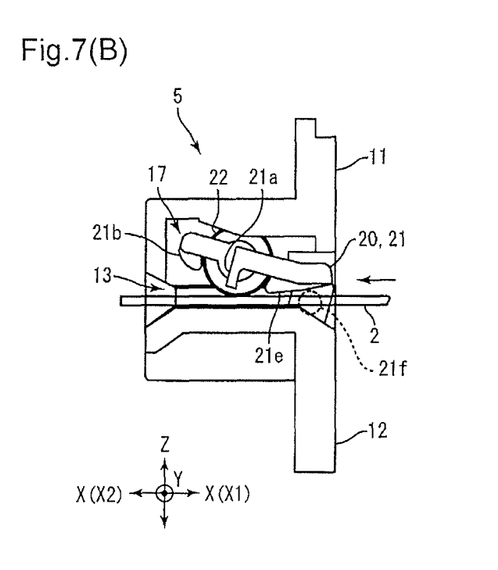
FIG. 7B shows a condition when the card being ejected.

Operation of Shutter Mechanism:

FIG. 6 includes drawings for explanation of operations of the shutter mechanism 17 shown in FIG. 3 at the time of inserting a card; namely, FIG. 6A shows a condition at the time of starting insertion of the card, and FIG. 6B shows a condition when the card being inserted. FIG. 7 includes drawings for explanation of operations of the shutter mechanism 17 shown in FIG. 3 at the time of ejecting a card; namely, FIG. 7A shows a condition at the time of starting ejection of the card, and FIG. 7B shows a condition when the card being ejected.

Operations of the shutter mechanism 17 at the time of inserting and ejecting the card 2 are explained below in the order of insertion and then ejection.

As described above, the closing part 21a usually closes the card path 13 due to the biasing force of the compression coil springs 23. Under the condition, when the card 2 is inserted into the card path 13 as shown in FIG. 6A, the forefront of the card 2 (specifically, forefront parts at both ends in the direction Y of the card 2) comes in contact with the bottom ends of the slants 21b at first. When the forefront of the card 2 contacts with the bottom ends of the slants 21b, the shutter part 20 (including the shutter part main body 21 and the rollers 22) rotates on the shaft sections 21f in a direction to open the card path 13. In other words, the closing part 21a lifts up above the card path 13 to open the card path 13, and the shutter part 20 rotates on the shaft sections 21f in a clockwise direction shown in FIG. 6.

When the card 2 is further inserted into the card path 13, the forefront of the card 2 (specifically, its forefront parts at both ends in the direction Y) comes in contact with the rollers 22, and squeezes itself in under the rollers 22 so that the shutter part 20 rotates to further open the card path 13. Then, being guided by the rollers 22, the card 2 moves in the backward direction as shown in FIG. 6B. At the time, the rollers 22 rotate while contacting with an upper surface of the card 2. Incidentally, when the forefront of the card 2 comes in contact with the rollers 22 and squeezes itself in under the rollers 22, the slants 21b come not to contact with the card 2 anymore.

While the rollers 22 are contacting with the upper surface of the card 2 and rotating, flat parts of the bottom sides of the card transit sections 21e are almost in parallel with the transfer direction of the card 2, as shown in FIG. 6B, so that the card transit sections 21e guide the card 2 to the main body 4 located at a backward side of the card path 13.

After the card 2 passes through under the rollers 22 and enters the main body 4, the shutter mechanism 17 restores the closing condition with the closing part 21a on the card path 13 due to the biasing force of the compression coil springs 23. Therefore, until the card 2 is ejected after processing the card 2 in the main body 4, the closing part 21a keeps closing the card path 13 as shown in FIG. 7A.

When the card 2 is to be ejected under the condition, an end at the frontward side of the card 2 (a backward end of the card 2; specifically, backward ends at both ends in the direction Y of the card 2) comes in contact with bottom ends of the card transit sections 21e at first. When the backward ends of the card 2 contact with the bottom ends of the card transit sections 21e, the shutter part 20 rotates on the shaft sections 21f in the direction to open the card path 13.

When the card 2 is further ejected, the backward ends of the card 2 come in contact with the rollers 22, and squeeze themselves in under the rollers 22 so that the shutter part 20 rotates to further open the card path 13. Then, being guided by the rollers 22, the card 2 is ejected in the frontward direction. At the time, the rollers 22 rotate while contacting with the upper surface of the card 2.

At this moment, if it is attempted to insert any foreign material such as an inappropriate card having its width narrower than that of the card 2, a stick, and others into the card path 13 while the card path 13 being closed, the foreign material collides with the closing part 21a without contacting the slants 21b. As described above, under a condition where the closing part 21a closes the card path 13, the frontward wall of the closing part 21a is so tilted somewhat as to have a lower part on the wall positioned further frontward. Therefore, when the foreign material collides with the closing part 21a, a rotating force arises for the shutter part 20 to rotate on the shaft sections 21f in a counterclockwise direction (namely to make the closing part 21a move toward the bottom surface of the card path 13). Accordingly, this operation prevents insertion of the foreign material under the condition where the card path 13 is closed. In the present embodiment, the frontward wall of the closing part 21a is a tilted surface that makes the closing part 21a rotate in a reverse direction to the direction of opening the card path 13 when being pressed from a frontward point under the condition where the card path 13 is closed.

In the present embodiment, the slants 21b and the rollers 22 constitute a card contacting section with which the forefront of the card 2 inserted into the card path 13 comes in contact.

Primary Advantageous Effect of the Present Embodiment

As described above, in the present embodiment; when the forefront of the card 2 comes in contact with the slants 21b and the rollers 22, the closing part 21a rotates on the shaft sections 21f to open the card path 13. Therefore, no driving source is required for opening/closing the card path 13 so that a structure of the shutter mechanism 17 can be simplified.

In the present embodiment, the shaft sections 21f act as a rotation center of the closing part 21a. Therefore, in the case where a foreign material is inserted into the card path 13 to collide with the closing part 21a, a force of the collision acts on the shaft sections 21f. However, in the present embodiment, since the closing part 21a is formed almost at the middle position of the shutter part main body 21 in the direction X and the shaft sections 21f are located at a backward end side in the shutter part main body 21, it is possible to shorten a distance from the colliding part of the foreign material and the closing part 21a to the shaft sections 21f in the direction Z at the time when the foreign material is inserted into the card path 13. Especially, in the present embodiment, the shaft sections 21f are formed in such a way that the center of the card path 13 in the direction Z almost coincides with the radial center of the shaft sections 21f in the direction Z. Therefore, when the foreign material collides with the closing part 21a for closing the card path 13, a compressive force acts on the shutter part 20 in a direction toward the shaft sections 21f. As a result, in the present embodiment, the shutter mechanism 17 can have an improved strength required for preventing insertion of a foreign material with a simple structure, for example, in comparison with a shutter mechanism described in Patent Document 1.

Furthermore, in the present embodiment, the closing part 21a and the shaft sections 21f are located at their corresponding positions that are displaced from each other in the transfer direction of the card 2; and when the forefront of the card 2 comes in contact with the slants 21b and the rollers 22, the closing part 21a rotates on the shaft sections 21f to open the card path 13. Therefore, according to the present embodiment, the shutter mechanism 17 can be downsized in the direction Z.

According to the present embodiment, the shaft sections 21f are located at a backward end side in the inserting direction of the card 2 in the shutter part 20. Therefore, the shutter part 20 can rotate more easily when the card 2 is transferred in an ejecting direction than when the card 2 being transferred in the inserting direction. Then, according to the present embodiment, the card 2 at the time of being ejected passes through the card path 13 more easily so that the card 2 can be ejected more smoothly.

According to the present embodiment, the shutter part 20 includes the rollers 22 that rotate while the rollers 22 are contacting with the card 2. Therefore, the card 2 can be transferred smoothly, and a transfer load for the card 2 can be reduced. Furthermore, causing damage on the card 2 can be suppressed.

According to the present embodiment, the shutter part 20 has the slants 21b at frontward positions before the rollers 22; and when the forefront of the card 2 comes in contact with the slants 21b, the rollers 22 revolve around the shaft sections 21f to open the card path 13. Therefore, even if a diameter of the rollers 22 is prepared to be comparatively small, the rollers 22 can rotate smoothly at the time when the forefront of the card 2 comes in contact with the rollers 22. As a result, the shutter mechanism 17 can be downsized by making the diameter of the rollers 22 smaller. Furthermore, when the forefront of the card 2 comes in contact with the rollers 22 and then squeezes itself in under the rollers 22, the slants 21b come not to contact with the card 2 anymore so that causing damage on the surface of the card 2 can be suppressed.

According to the present embodiment; when the shutter part 20 rotates to open the card path 13, the card transit sections 21e prepared in the shutter part 20 guide the card 2 to the backward side of the card path 13. Therefore, the card 2 can be guided to the main body 4 appropriately even without preparing a guide mechanism separately for guiding the card 2 to the main body 4 located at a backward side of the card insertion slot 5.

Furthermore, according to the present embodiment, the bottom sides of the card transit sections 21e are formed to be flat in such a way that the bottom sides are tilted upward as a point of the bottom sides is positioned further in the backward direction, when the card path 13 is closed. Therefore, when ejecting the card 2, the card transit sections 21e can appropriately guide the card 2, ejected from the main body 4, to the ejecting direction.

According to the present embodiment; under the condition where the closing part 21a closes the card path 13, the frontward wall of the closing part 21a is so tilted somewhat as to have a lower part on the wall positioned further frontward. Accordingly, this arrangement enables preventing insertion of the foreign material under the condition where the card path 13 is closed, as described above.

According to the present embodiment, the cover 18 is transparent or translucent. Furthermore, the light emitting elements 15 flash when the card 2 exists in the main body 4. Therefore, by visually checking whether or not the emitting elements 15 are flashing, a user can recognize whether the card 2 exists in the main body 4 or not. Then, according to the present embodiment, inserting the card 2 wrongly can be avoided.

Other Embodiments

Described above is an example of a preferred embodiment according to the present invention. However, the present invention is not limited to the above embodiment and various variations and modifications may be made without changing the concept of the present invention.

In the embodiment described above, the shaft sections 21f are placed at a further backward side than the closing part 21a. However, the shaft sections 21f may be placed at a further frontward side than the closing part 21a. In such a case, when a foreign material collides with the closing part 21a, a tensile force acts on the shutter part 20 in a direction away from the shaft sections 21f. Then, even in this case, the same effect as described above for better improvement of a strength required for preventing insertion of a foreign material than ever before can be materialized.

In the embodiment described above, the shaft sections 21f are formed in such a way that the center of the card path 13 in the direction Z almost coincides with the radial center of the shaft sections 21f in the direction Z. However, for example otherwise, the shaft sections 21f may be prepared in such a way that the radial center of the shaft sections 21f is located at a position either higher or lower than the center of the card path 13 in the direction Z.

In the embodiment described above, the shutter part 20 is equipped with the rollers 22. However, instead of the rollers 22, a protrudent slider having excellent sliding characteristics may be formed in the shutter part 20. In such a case, the protrudent slider and the slants 21b may be formed together as one component. Furthermore, another configuration may also be possible, in which the card 2 inserted directly contacts with the rollers 22 without the slants 21b formed in the shutter part main body 21.

In the embodiment described above, the shaft sections 21f are formed together with the shutter part main body 21 as one component. However, for example otherwise, shaft sections may be formed separately from the shutter part main body 21, and the shutter part main body 21 is so supported by the shaft sections as to be rotatable. In such a case, the shaft sections may be fixed to the shutter part main body 21 and so supported by the lower bezel 12 as to be rotatable; or being fixed to the lower bezel 12, the shaft sections may support the shutter part main body 21 in such a way as to make the shutter part main body 21 rotatable.

In the embodiment described above, when the forefront of the card 2 comes in contact with either of the two slants 21b and the two rollers 22 that are positioned at both the ends in the direction Y, the shutter part 20 rotates on the shaft sections 21f to open the card path 13. For example otherwise, lock levers 30 for locking the rotation of the shutter part 20 may be placed at both the ends in the direction Y, as shown in FIG. 8, in such a way that the shutter part 20 rotates on the shaft sections 21f when both the ends in the direction Y of the card 2 come in contact with the lock levers 30 to have the lock levers 30 unlock the shutter part 20. In other words, such a configuration may be applied to allow the shutter part 20 to open the card path 13 only when the card 2 having a qualified card width is inserted. This arrangement enables preventing insertion of a foreign material more certainly.

Figure 8A:
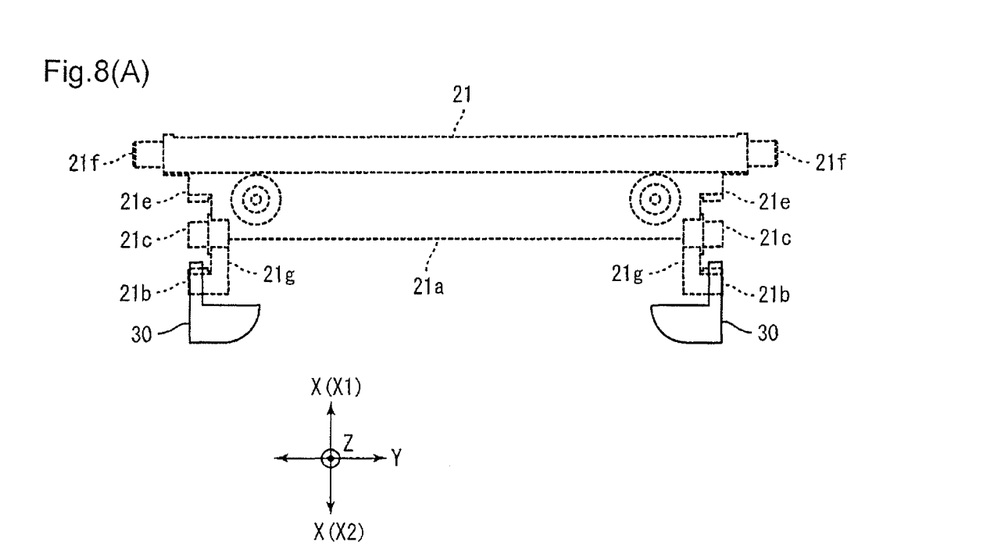
FIG. 8A shows a condition when a lock lever is locking a shutter section.
Figure 8B:
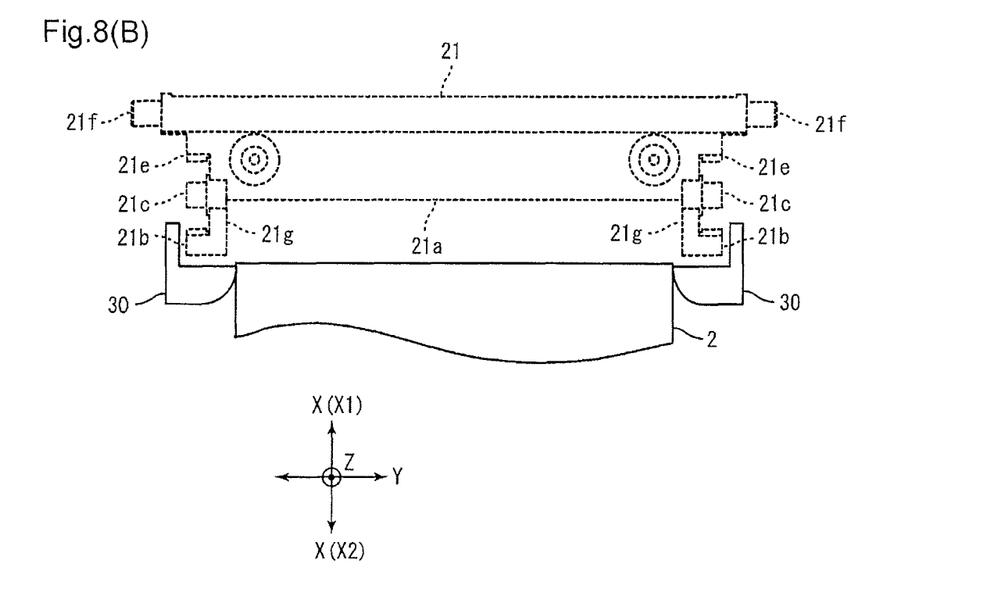
FIG. 8B shows a condition when a locking part of the lock lever is out of locking operation.

For example in this case, when the lock levers 30 lock the shutter part 20, the lock levers 30 contact the frontward ends of the shutter part 20 from elevated positions, as shown in FIG. 8A. Meanwhile, the lock levers 30 are biased inward in the direction Y by biasing members that are not shown. Under the condition, when the card 2 is inserted, both the ends in the direction Y of the card 2 come in contact with the lock levers 30 to move the lock levers 30 outward in the direction Y, as shown in FIG. 8B. As moving outward in the direction Y, the lock levers 30 are shifted away from their positions on the shutter part 20 so that the shutter part 20 becomes ready to rotate.

Furthermore, a pin shutter may be placed together with the closing part 21a to close the card path 13 while the card 2 inserted exists in the main body 4. In this case, a configuration may be prepared in such a way as to allow the shutter pin to appear in the card path 13, for example, by using a solenoid as a driving source. This arrangement enables preventing inadequate insertion of the card 2 for sure.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

Reference Numerals

1 Card reader
2 Card
4 Main body
5 Card insertion slot
13 Card path
15 Light emitting element (Light emitting member)
17 Shutter mechanism
18 Cover
20 Shutter part
21 Shutter section main body
21a Closing section
21b Slant (a part of a card contact section)
21e Card transit section
21f Shaft part
22 Roller (a part of the card contact section)
X1 Inserting direction
Z Thickness direction

What is claimed is:

1. A shutter mechanism of a card reader comprising:
    a shutter part configured to open and/or close a card path through which a card is transferred;
    wherein the shutter part includes:
        a closing part configured to close the card path;
        a card contacting section located at a further frontward position from the closing part in an inserting direction of the card, an end part of the card inserted into the card path coming into contact with the card contacting section; and
        shaft sections, having their rotation axis in a direction substantially perpendicular to the card inserting direction, operable to support the closing part and the card contacting section so as to keep them rotatable;
    wherein the closing part and the shaft sections are located at corresponding positions that are displaced from each other in the card inserting direction;
    wherein a center of the card path in a thickness direction of the card substantially coincides with a radial center of the shaft sections in the card thickness direction;
    wherein the closing part and the card contacting section rotate on the shaft sections to open the card path, when the end part of the card contacts with the card contacting section.

2. The shutter mechanism of a card reader according to claim 1;
    wherein the shaft sections are located at a further backward position of the shutter part in the card inserting direction.

3. The shutter mechanism of a card reader according to claim 1;
    wherein the card contacting section includes rollers that rotate while contacting with the card; and
    wherein the rollers are disposed on both sides of the card path in the direction substantially perpendicular to the card inserting direction so as to be configured to contact with both end parts of the card in the direction substantially perpendicular to the card inserting direction.

4. The shutter mechanism of a card reader according to claim 3;
   wherein the card contacting section includes slants, operable to contact with the end part of the card, at a further frontward position from the rollers in the card inserting direction; and
   wherein the rollers revolve around the shaft sections in a direction to open the card path when the end part of the card comes in contact with the slants.

5. The shutter mechanism of a card reader according to claim 3 a lock lever configured to lock to ration of the closing part and the card contacting section;
   wherein the lock lever is disposed on both sides of the card path in the direction substantially perpendicular to the card inserting direction so as to be configured to contact with both end parts of the card in the direction substantially perpendicular to the card inserting direction; and
   wherein, when the both end parts of the card in the direction substantially perpendicular to the card inserting direction contact with the lock lever, a locking state of the closing part and the card contacting section by the lock lever is released.

6. The shutter mechanism of a card reader according to claim 1;
   wherein the shutter part includes card transit sections, at a further backward position from the closing part in the card inserting direction, configured to guide the card in a backward direction of the card path in the card insertion direction when the closing part and the card contacting section rotate in the direction to open the card path.

7. The shutter mechanism of a card reader according to claim 1;
   wherein the closing part includes a tilted surface tilting so as to make the closing part rotate in a reverse direction to the direction of opening the card path when being pressed from a inserting side of the card under the condition where the card path is closed.

8. A card reader comprising:
the shutter mechanism of a card reader according to claim 1 at a card insertion slot.

9. The card reader according to claim 8;
wherein the card insertion slot includes:
   a light emitting member that flashes when the card exists in a main body of the card reader; and
   a cover which is transparent or translucent, and is configured to cover the light emitting member.

10. A shutter mechanism of a card reader comprising:
a shutter part configured to open and/or close a card path through which a card is transferred;
wherein the shutter part includes:
   a closing part configured to close the card path;
   a card contacting section located at a further frontward position from the closing part in an inserting direction of the card, an end part of the card inserted into the card path coming into contact with the card contacting section; and
   shaft sections, having their rotation axis in a direction substantially perpendicular to the card inserting direction, operable to support the closing part and the card contacting section so as to keep them rotatable;
wherein the closing part and the shaft sections are located at corresponding positions that are displaced from each other in the card inserting direction;
wherein the closing part and the card contacting section rotate on the shaft sections to open the card path, when the end part of the card contacts with the card contacting section;
wherein the card contacting section includes rollers that rotate while contacting with the card;
wherein the card contacting section includes slants, operable to contact with the end part of the card, at a further frontward position from the rollers in the card inserting direction; and
wherein the rollers revolve around the shaft sections in a direction to open the card path when the end part of the card comes in contact with the slants.

* * * * *